United States Patent [19]

White et al.

[11] 4,330,666

[45] May 18, 1982

[54] METHOD FOR MAKING POLYETHERIMIDES

[75] Inventors: Dwain M. White, Schenectady, N.Y.; David G. Keyes, Minneapolis, Minn.

[73] Assignee: General Electric Company, Schenectady, N.Y.

[21] Appl. No.: 188,756

[22] Filed: Sep. 19, 1980

[51] Int. Cl.$^3$ .............................................. C08G 73/10
[52] U.S. Cl. ..................................... 528/207; 528/21; 528/173
[58] Field of Search .......................... 528/21, 173, 207

[56] References Cited

U.S. PATENT DOCUMENTS

| | | | |
|---|---|---|---|
| 3,847,870 | 11/1974 | Takekoshi | 528/14 |
| 3,850,885 | 11/1974 | Takekoshi et al. | 528/14 |
| 3,998,840 | 12/1976 | Williams et al. | 528/14 |

OTHER PUBLICATIONS

4—Dialkylaminopyridines as Highly Active Acylation Catalysts, Hofle et al., Angew. Chem. Int. Ed. Engl. 17, 569–583, (1978).
Structural Effects on the Rates of Formation of Amic Acids and Imides, Dror et al., J. Chem. Soc., Perkin II, 1425, (1974).
NASA Tech Brief, PB80-972160, ARC-11107, Improved Imide Polymerization Catalyst.
A Study of Base-Catalyzed and Salt-Catalyzed Acetylation of Hydroxyl Groups, Schenk et al., Anal. Chem., 34, 914–919, (1964).
Preparation of Acyclic Imides, Hurd et al., J. of Org. Chem., vol. 24, pp. 388–392, (1959).
Cyclization of Aromatic Polyamido Acids to Polyimides, Lavrov et al., Chemical Abstracts, vol. 87, (1977), p. 4.
A Case History of Transmuting an Idea into Money, M. Orchin., J. of Chem. Education, p. 782.
The Preparation of Phthalamic Acids and Their Conversion into Anthranilic Acids, Chapman et al., J. Chem. Soc. 127, 1791, (1925).

*Primary Examiner*—Maurice J. Welsh
*Attorney, Agent, or Firm*—William A. Teoli; James C. Davis, Jr.

[57] ABSTRACT

A method is provided for making polyetherimides based on the use of certain amphoteric catalysts such as hydroxy pyridines or aminocarboxylic acids to accelerate the intercondensation of aromatic bis(ether anhydride) and organic diamine or prepolymer thereof under solution or melt polymerization conditions.

9 Claims, No Drawings

METHOD FOR MAKING POLYETHERIMIDES

CROSS REFERENCE TO RELATED APPLICATIONS

Reference is made to our copending application Ser. No. 188,754, Method for Making Polyetherimides and application Ser. No. 188,755 of Tohru Takekoshi, Method for Making Polyimide, filed concurrently herewith and assigned to the same assignee as the present invention.

BACKGROUND OF THE INVENTION

The present invention relates to a method for making polyetherimide based on the intercondensation of aromatic bis(ether anhydride) and organic diamine in the presence of certain amphoteric catalysts, such as hydroxypyridine under solution or melt polymerization conditions.

Prior to the present invention, certain catalysts such as sodium chloride and ferric sulfate, as shown by Williams et al, U.S. Pat. No. 3,998,840, assigned to the same assignee as the present invention, were used to enhance the rate of formation of polyetherimide under melt polymerization conditions. Although valuable results were achieved by such procedures, it was found that the aforementioned catalysts were either less effective or not effective when utilized for making polyetherimides from aromatic bis(ether anhydride) and organic diamine under solution polymerization conditions. In addition, the presence of chloride ion may interfere with the use of such polyetherimide in electrical applications. Various metal compounds were also used to catalyze polyetherimide formation by imide-amine exchange reactions, as shown by U.S. Pat. No. 3,847,870, Takekoshi and U.S. Pat. No. 3,850,885, Takekoshi et al, assigned to the same assignee as the present invention. However, the nature of the polymerization is quite different from polyetherimide formation by the melt polymerization of aromatic bis(ether anhydride) and organic diamine, which is amine-anhydride interaction rather than imide-amine exchange.

STATEMENT OF THE INVENTION

The present invention is based on the discovery that certain amphoteric compounds, for example, 4-hydroxypyridine and particular aliphatic amino carboxylic acids can substantially enhance the rate of formation of polyetherimide resulting from aromatic bis(ether anhydride) and organic diamine interaction under melt polymerization or solution polymerization conditions. In addition, polyetherimide made in accordance with the present invention has shown a reduction in its Yellow Index Value as compared to polyetherimide made free of catalyst.

There is provided by the present invention a method for making polyetherimide which comprises effecting the intercondensation of aromatic bis(ether anhydride) of the formula,

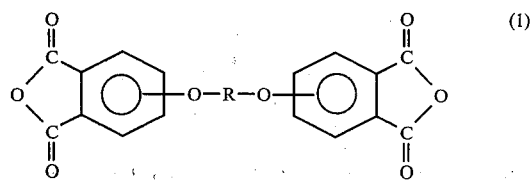

and organic diamine of the formula,

in the presence of an effective amount of amphoteric catalyst selected from the class consisting of hydroxypyridines and aliphatic amino carboxylic acids, where R is a divalent aromatic organic radical having from 6–30 carbon atoms and $R^1$ is a divalent organic radical selected from R radicals, alkylene radicals having from 2–20 carbon atoms, cycloalkylene radicals and $C_{(2-8)}$ alkylene terminated polydiorganosiloxanes.

Radicals included by R are, for example, aromatic hydrocarbon radicals and halogenated aromatic hydrocarbon radicals, for example, phenylene, tolylene, chlorophenylene, naphthalene, etc., and radicals included by the formula,

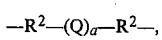

where $R^2$ is a divalent aromatic radical having 6–13 carbon atoms selected from hydrocarbon radicals and halogenated hydrocarbon radicals, and Q is a divalent organo radical selected

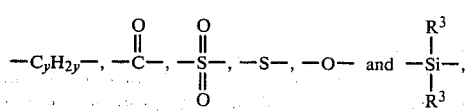

where a is 0 or 1, y is an integer having a value of from 1–5 inclusive, and $R^3$ is a monovalent hydrocarbon radical selected from methyl, phenyl, etc.

Radicals included by $R^1$ are, for example,

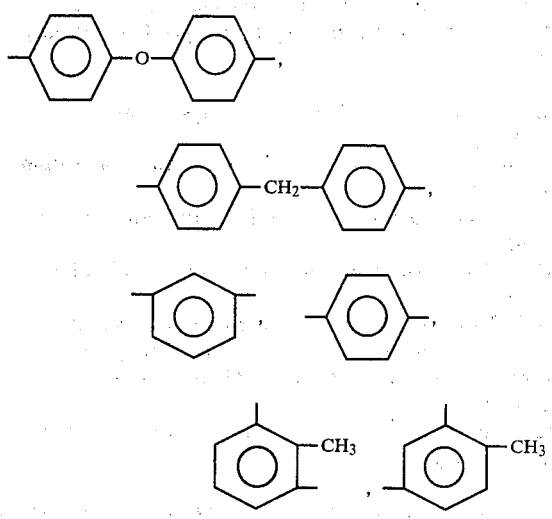

etc.; alkylene radicals such as hexamethylene, etc., cyclohexylene, etc.,

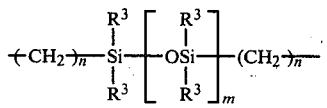

where R is as defined above, m is equal to 0 to 100 inclusive and n is 2–8 inclusive.

Included by the aromatic bis(ether anhydride) of formula (1) which can be used in the practice of the present invention are, for example,

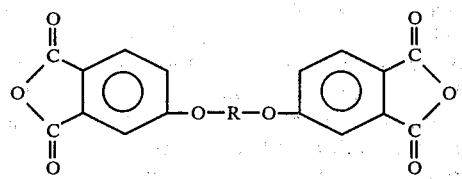

(3)

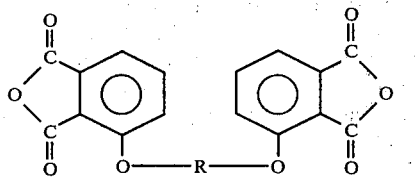

(4)

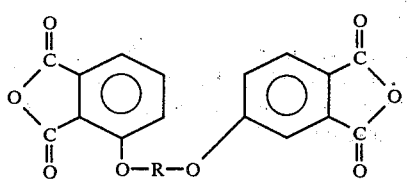

(5)

where R is as defined above.
Dianhydrides included by formula (4) are, for example,
-2,2-bis[4-(2,3-dicarboxyphenoxy)phenyl]propane dianhydride-;
4,4'-bis(2,3-dicarboxyphenoxy)diphenyl ether dianhydride;
1,3-bis(2,3-dicarboxyphenoxybenzene dianhydride;
4,4'-bis(2,3-dicarboxyphenoxy)diphenylsulfide dianhydride;
1,4-bis(2,3-dicarboxyphenoxy)benzene dianhydride;
4,4'-bis(2,3-dicarboxyphenoxy)diphenylsulfone dianhydride; etc.

Dianhydrides included by formulas (3) and (5) are, for example,
2,2-bis[4-(3,4-dicarboxyphenoxy)-phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'-(3,4-dicarboxyphenoxy)-2,2-diphenylpropane dianhydride, etc.

Included by the organic diamines of formula (2) are, for example,
M-phenylenediamine;
p-phenylenediamine;
4,4'-diaminodiphenylpropane;
4,4-diaminodiphenylmethane;
benzidine;
4,4'-diaminodiphenylsulfide;
4,4'-diaminodiphenylsylfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis-(3-aminopropyl)tetramethyldisiloxane;
bis-(4-aminobutyl)tetramethyldisiloxane; etc.

Amphoteric compounds which can be employed as catalysts in the practice of the invention are, for example hydroxypyridines such as: 2-hydroxypyridine, 3-hydroxypyridine, 4-hydroxypyridine, 2-hydroxy-4-methylpyridine, 2,4-dihydroxypyridine, etc.

Additional amphoteric compounds which can be utilized in the practice of the invention as polyetherimide polymerization catalysts, are aliphatic amino acids preferably having between 4 and 20 carbon atoms which are sufficiently soluble in the reaction mixture to provide at least 1000 parts of catalyst, per million of reaction mixture. Some of these catalysts are, for example: N,N-dimethylglycine; β(N,N-dimethylamine)propionic acid; N-methylproline, etc.

In the practice of the present invention, reaction can be effected between the organic dianhydride and the organic diamine or prepolymers thereof in the presence of an effective amount of the amphoteric catalyst under solution polymerization conditions at a temperature in the range of from 130° C. to 300° C. or under melt polymerization conditions at a temperature of from 250° C. to 350° C.

In instances where solution polymerization is practiced, there can be utilized various organic solvents, for example, chlorobenzene;
o-dichlorobenzene;

m-dichlorobenzene;
1,2,4-trichlorobenzene;
4-chlorotoluene;
4-chloroanisole;
bromobenzene;
biphenyl;
phenyl ether; etc.

It has been found that a proportion of from about 0.9 to 1.1 moles of organic diamine, per mole of organic dianhydride can be used while substantially equal molar amounts of such reactants are preferred. Depending upon the molecular weight desired in the polyetherimide, effective amounts of chain stoppers, such as aniline or phthalic anhydride, also can be used. The solids concentration of at least 10% by weight to 50% by weight during solution polymerization has been found to be effective.

The amphoteric catalyst can be employed at a concentration of about 0.01% to 5% by weight, and preferably 0.1% to 2%, based on the weight of the total solids. Reaction times can vary widely depending upon the particular aromatic organic dianhydride and organic diamine utilized, as well as the temperature of the reaction. However, an enhancement of the rate of reaction will be effected and readily discernable as the result of the use of the amphoteric catalyst.

In instances where melt polymerization is employed, substantially similar proportions of reactants and catalysts as described above for solution polymerization can be utilized in the absence of the organic solvent. Melt polymerization can be achieved satisfactorily in a melt extruder, as taught, for example, by Mellinger et al, U.S. Pat. No. 4,073,773.

The polyetherimides made in accordance with the practice of the present invention can be employed as high performance injection moldable thermoplastics. Depending upon the nature of the organic dianhydride and the organic diamine utilized, the resulting polyimides also can be utilized in a variety of other applications.

In order that those skilled in the art will be better able to practice the invention, the following examples are given by way of illustration and not by way of limitation. All parts are by weight.

EXAMPLE 1

A mixture of 163 parts of ortho-dichlorobenzene, 67.66 parts of 2,2-bis[4-(3,4-dicarboxyphenoxy)phenyl]propane dianhydride, 13.65 parts of meta-phenylenediamine, 0.712 part of aniline and 0.80 part of 2-hydroxypyridine was stirred under a nitrogen atmosphere and heated with an oil bath at 145° C. Within 5 minutes the temperature of the mixture rose to 120° C. and the precipitation of an intermediate reaction product was noted. The stirring of the mixture was increased and the precipitated solids were then redissolved. The oil bath temperature was increased to 195° C. during the first hour of reaction.

At the end of the 60 minute period, the ortho-dichlorobenzene in the mixture began to reflux. A small sample of the mixture was removed for GPC analysis. Additional samples were taken at intervals of 2, 4, 6, and 22 hours. A proportion of each of the samples was diluted with chloroform immediately upon removal for GPC analysis. The remainder of each sample was diluted with chloroform and precipitated from solution by adding the solution to a 10 fold volume of methanol, followed by filtration, washing the precipitate and drying. Product analysis was then determined.

The above procedure was repeated, except that other amphoteric materials were substituted for the 2-hydroxypyridine. The following results were obtained, where HP under "Catalyst" signifies 2,3-, or 4-hydroxypyridine, "WT% Catalyst" is based on the anticipitated weight of polymeric product and intrinsic viscosity, (I.V.) was measured in chloroform at 25° C. after the samples were removed at the indicated polymerization time:

TABLE I

| Catalyst | WT % Catalyst | I.V. after 1 Hr | 2 Hr | 6 Hr |
| --- | --- | --- | --- | --- |
| Control | 0% | 0.24 | 0.28 | 0.35 |
| 2-HP | 1% | .36 | .44 | .48 |
| 3-HP | 1% | .36 | .37 | .43 |
| 4-HP | 1% | .42 | .47 | .45[3] |
| DMG[1] | 1% | .42 | .44 | .49 |
| 4-DMAS[2] | 2% | .26 | .33 | .40 |
| Uracil | 0.1% | .24 | .26 | .34 |
| 8-Hydroxyquinoline | 1% | .25 | .29 | .31 |
| EDTA[4] | 0.1% | .24 | .26 | .29 |
| NTA[5] | 0.1% | .24 | .27 | .30 |

[1] N,N-dimethylglycine
[2] 4-dimethylaminosalicylic acid
[3] 5 hr. sample
[4] ethylenediamine tetra-acetic acid
[5] nitrotriacetic acid The above results show the significant enhancement in the rate of polyetherimide formation utilizing the amphoteric catalysts of the present invention as compared to the control. Closely related compounds such as uracil, and 8-hydroxyquinoline are shown to be ineffective due to structural differences to the pyridines while EDTA and NTA exhibit incompatibility.

EXAMPLE 2

A polyetherimide prepolymer was prepared as follows:

A mixture of 168.29 parts of 2,2-bis[4-(3,4-dicarboxyphenoxy)phenyl]propane dianhydride, 29.62 parts of phthalic anhydride, and 900 parts of methylene chloride was stirred at room temperature under nitrogen. A solution of 36.05 parts of m-phenylenediamine in 900 parts of water was added dropwise to the above solution over a period of 115 minutes. The resulting reaction mixture was further stirred for 4 hours at room temperature and then heated to distill off the methylene chloride. The temperature of the reaction mixture rose to 50° C. when the removal of the methylene chloride was complete. The resulting white slurry of the polyamide acid was filtered. The white precipitate was washed with water and dried; the yield was 98.2% of polyetherimide prepolymer.

The prepolymer was extruded through a vented 28 mm-W.P.-twin screw extruder at a temperature ranging from 140° C. in the first zone to 280°–340° C. in the remaining five zones, at a rapid rate to permit only partial polymerization when catalyst was not presented. One part of 2-hydroxypyridine was mixed with 200 parts of prepolymer and the mixture was extruded under the same conditions. The intrinsic viscosities of the extruded polyetherimides were compared:

| WT % 2-Hydroxypyridine | [η] of extruded polymer |
| --- | --- |
| 0.00 | 0.37 dl/g |

| WT % 2-Hydroxypyridine | [η] of extruded polymer |
|---|---|
| 0.50 | 0.53 dl/g |

The above results further show the effectiveness of the amphoteric catalyst of the present invention.

Although the above examples are directed to only a few of the very many variables within the scope of the method of the present invention, it should be understood that the present invention is directed to the use of a much broader variety of organic dianhydrides of formula (1) and organic diamines of formula (2), as well as amphoteric catalysts shown in the description preceding these examples.

What we claim as new and desire to secure by Letters Patent of the United States is:

1. A method for making polyetherimide which comprises effecting the intercondensation of aromatic bis(ether anhydride) of the formula,

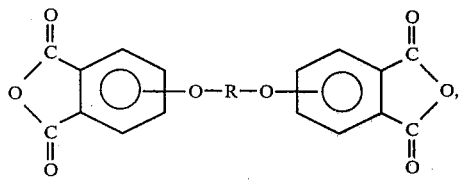

and organic diamine of the formula,
H₂NR¹NH₂ or prepolymer thereof in the presence of an effective amount of a compatible amphoteric catalyst selected from the class consisting of hydroxypyridines and aliphatic amino carboxylic acids, where R is a divalent aromatic organic radical having from 6–30 carbon atoms and $R^1$ is a divalent organic radical selected from R radicals, alkylene radicals having from 2–20 carbon atoms, cycloalkylene radicals and $C_{(2-8)}$ alkylene terminated polydiorganosiloxanes.

2. A method in accordance with claim 1, where R is

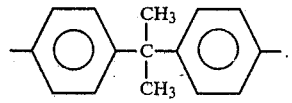

3. A method in accordance with claim 1, where $R^1$ is

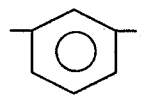

4. A method in accordance with claim 1, where the amphoteric catalyst is 2-hydroxypyridine.

5. A method in accordance with claim 1, where the reaction is conducted under solution polymerization conditions.

6. A method in accordance with claim 1, where the reaction is conducted under melt polymerization conditions.

7. A method in accordance with claim 1, where the amphoteric catalyst is 3-hydroxypyridine.

8. A method in accordance with claim 1, where the amphoteric catlayst is 4-hydroxypyridine.

9. A method in accordance with claim 1, where the amphoteric catalyst is dimethylglycine.

* * * * *